United States Patent
Mao et al.

(10) Patent No.: US 11,481,862 B2
(45) Date of Patent: Oct. 25, 2022

(54) SYSTEM AND METHOD FOR REAL-TIME, SIMULTANEOUS OBJECT DETECTION AND SEMANTIC SEGMENTATION

(71) Applicants: Beijing Jingdong Shangke Information Technology Co., Ltd., Beijing (CN); JD.com American Technologies Corporation, Mountain View, CA (US)

(72) Inventors: Hongda Mao, Mountain View, CA (US); Wei Xiang, Mountain View, CA (US); Chumeng Lyu, Mountain View, CA (US); Weidong Zhang, Mountain View, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

(*) Notice: Subject to any disclaimer, the term of this patent is extended or adjusted under 35 U.S.C. 154(b) by 304 days.

(21) Appl. No.: 16/802,078

(22) Filed: Feb. 26, 2020

(65) Prior Publication Data
US 2021/0264557 A1 Aug. 26, 2021

(51) Int. Cl.
| G06T 1/00 | (2006.01) |
| G06T 1/20 | (2006.01) |
| G06N 3/04 | (2006.01) |
| G06V 30/194 | (2022.01) |

(52) U.S. Cl.
CPC ............ G06T 1/20 (2013.01); G06N 3/0454 (2013.01); G06V 30/194 (2022.01)

(58) Field of Classification Search
CPC ............ G06T 1/20; G06T 2207/20016; G06T 2207/20081; G06T 2207/20084;
(Continued)

(56) References Cited

U.S. PATENT DOCUMENTS

| 10,007,865 B1* | 6/2018 | Kim ..................... G06V 10/454 |
| 10,408,939 B1* | 9/2019 | Kim ..................... G06V 10/82 |

(Continued)

FOREIGN PATENT DOCUMENTS

| CN | 106651877 A | 5/2017 |
| CN | 110197182 A | 9/2019 |
| CN | 110245665 A | 9/2019 |

OTHER PUBLICATIONS

Xiang, Wei et al., ThunderNet: a turbo unified network for real-time segmentation, 2019 IEEE Winter Conference on Applications of Computer Vision, 2019, 1789-1795. (Year: 2019).*

(Continued)

*Primary Examiner* — Van D Huynh
(74) *Attorney, Agent, or Firm* — Scully, Scott, Murphy & Presser, P.C.

(57) ABSTRACT

System and method for simultaneous object detection and semantic segmentation. The system includes a computing device. The computing device has a processor and a non-volatile memory storing computer executable code. The computer executable code, when executed at the processor, is configured to: receive an image of a scene; process the image using a neural network backbone to obtain a feature map; process the feature map using an object detection module to obtain object detection result of the image; and process the feature map using a semantic segmentation module to obtain semantic segmentation result of the image. The object detection module and the semantic segmentation module are trained using a same loss function comprising an object detection component and a semantic segmentation component.

15 Claims, 5 Drawing Sheets

(58) Field of Classification Search
CPC ... G06T 2207/30252; G06T 7/11; G06T 7/73; G06N 3/0454; G06N 3/08; G06V 30/194; G06V 10/451; G06V 10/82; G06V 20/00; G06K 9/627
USPC .......................................................... 382/156
See application file for complete search history.

(56) References Cited

U.S. PATENT DOCUMENTS

| | | | |
|---|---|---|---|
| 2018/0174046 A1 | 6/2018 | Xiao et al. | |
| 2019/0065867 A1* | 2/2019 | Huang | G06T 7/10 |
| 2020/0302214 A1* | 9/2020 | Arani | G06N 3/0454 |
| 2021/0158043 A1* | 5/2021 | Hou | G06V 20/58 |

OTHER PUBLICATIONS

Jonathan Long et al., Fully Convolutional Models for Semantic Segmentation, IEEE Conference on Computer Vision and Pattern Recognition, 2015, arXiv: 1411.4038. (Year: 2015).*

Hengshuang Zhao et al, Pyramid Scene Parsing Network, IEEE Conference on Computer Vision and Pattern Recognition, 2017, arXiv: 1612.01105. (Year: 2017).*

Hengshuang Zhao et al., Pyramid Scene Parsing Network, IEEE Conference on Computer Vision and Pattern Recognition, 2017, arXiv:1612.01105.

Jonathan Long et al., Fully Convolutional Models for Semantic Segmentation, IEEE Conference on Computer Vision and Pattern Recognition, 2015, arXiv:1411.4038.

Cheng-Yang Fu et al., DSSD: Deconvolutional Single Shot Detector, 2017, arXiv: 1701.06659.

Zeming Li et al., Light-Head R-CNN, In Defense of Two-Stage Object Detector, 2017, arXiv:1711.07264.

Kaiming He, Mask R-CNN, IEEE Conference on Computer Vision and Pattern Recognition, 2018, arXiv:1703.06870.

Xiang, Wei et al., ThunderNet: a turbo unified network for real-time segmentation, 2019 IEEE Winter Conference on Applications of Computer Vision, 2019, 1789-1795.

PCT/CN2021/076914 International Search Report and Written Opinion of the International Searching Authority, dated May 19, 2021.

* cited by examiner

SYSTEM AND METHOD FOR REAL-TIME, SIMULTANEOUS OBJECT DETECTION AND SEMANTIC SEGMENTATION

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to computer vision, and more particularly to systems and methods for real-time, simultaneous object detection and semantic segmentation.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

It is critical for autonomous driving cars to timely understand their surrounding environment, such as cars, pedestrians, traffic lights, traffic signs and free spaces. To achieve this goal, autonomous driving system typically needs to conduct multiple vision-based tasks, such as object detection, semantic segmentation, motion estimation, and 3D reconstruction. Among them, object detection and semantic segmentation are two of the most important tasks. However, it is quite computationally expensive to conduct each task given the limited computational power of the car.

Therefore, an unaddressed need exists in the art to address the aforementioned deficiencies and inadequacies.

SUMMARY OF THE INVENTION

In certain aspects, the present disclosure related to a system for object detection and semantic segmentation. In certain embodiments, the system includes a computing device.

The computing device has a processor and a non-volatile memory storing computer executable code. The computer executable code, when executed at the processor, is configured to: receive an image of a scene; process the image using a neural network backbone to obtain a feature map; process the feature map using an object detection module to obtain object detection result of the image; and process the feature map using a semantic segmentation module to obtain semantic segmentation result of the image. The object detection module and the semantic segmentation module are trained using a same loss function comprising an object detection component and a semantic segmentation component.

In certain embodiments, training data for the object detection module and the semantic segmentation module includes: a training image, at least one bounding box defined in the training image, label of the at least one bounding box, and mask of the training image.

In certain embodiments, the neural network backbone comprises a ResNet18 backbone truncated away from its $4^{th}$ block.

In certain embodiments, the object detection module is a single shot detector (SSD). In certain embodiments, the object detection module consists of sequentially: five convolution layers; a detection layer; and a non-maximum suppression (NMS) layer. In certain embodiments, for a 512×512 resolution of the image, the neural network backbone convolutionally adds 64×64 information and 32×32 information to the detection layer, and the five convolutional layers respectively add 16×16 information, 8×8 information, 4×4 information, 2×2 information, and 1×1 information to the detection layer.

In certain embodiments, the semantic segmentation module is a pyramid pooling module.

In certain embodiments, the semantic segmentation module consists sequentially: a pooling module pooling the feature map to obtain pooled features at different sizes; a plurality of convolution layers each convoluting one of the pooled features at different sizes to obtain convoluted features at different sizes; an upsample module receiving the convoluted features at different sizes to obtain upsampled feature; a concatenation layer receiving the upsampled feature and feature from the neural network backbone to obtain concatenated feature; and a convolution layer convoluting the concatenated feature to obtain per-pixel prediction as the semantic segmentation result. In certain embodiments, the pooled features are at sizes of 1×1, 2×2, 3×3, and 6×6.

In certain embodiments, the computer executable code is further configured to control an operative device in the scene based on the object detection result and the semantic segmentation result.

In certain aspects, the present invention relates to a method for object detection and semantic segmentation. In certain embodiments, the method includes: receiving, by a computing device, an image of a scene; processing, by the computing device, the image using a neural network backbone to obtain a feature map; processing, by the computing device, the feature map using an object detection module to obtain object detection result of the image; and processing, by the computing device, the feature map using a semantic segmentation module to obtain semantic segmentation result of the image. The object detection module and the semantic segmentation module are trained using a same loss function comprising an object detection component and a semantic segmentation component.

In certain embodiments, training data for the object detection module and the semantic segmentation module comprises: a training image, at least one bounding box defined in the training image, label of the at least one bounding box, and mask of the training image.

In certain embodiments, the neural network backbone comprises a ResNet18 backbone truncated away from its $4^{th}$ block.

In certain embodiments, the object detection module is a single shot detector (SSD).

In certain embodiments, the object detection module consists of sequentially: five convolution layers; a detection layer; and a non-maximum suppression (NMS) layer. In certain embodiments, for a 512×512 resolution of the image, the neural network backbone convolutionally adds 64×64 information and 32×32 information to the detection layer, and the five convolutional layers respectively add 16×16 information, 8×8 information, 4×4 information, 2×2 information, and 1×1 information to the detection layer.

In certain embodiments, the semantic segmentation module is a pyramid pooling module.

In certain embodiments, the semantic segmentation module consists sequentially: a pooling module pooling the feature map to obtain pooled features at different sizes; a plurality of convolution layers each convoluting one of the pooled features at different sizes to obtain convoluted features at different sizes; an upsample module receiving the convoluted features at different sizes to obtain upsampled feature; a concatenation layer receiving the upsampled feature and feature from the neural network backbone to obtain concatenated feature; and a convolution layer convoluting the concatenated feature to obtain the semantic segmentation result.

In certain embodiments, the method further includes: controlling an operative device in the scene based on the object detection based on the object detection result and the semantic segmentation result.

In certain aspects, the present invention relates to a non-transitory computer readable medium storing computer executable code. The computer executable code, when executed at a processor of a computing device, is configured to perform the methods described above.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION OF THE INVENTION

Figure 1:
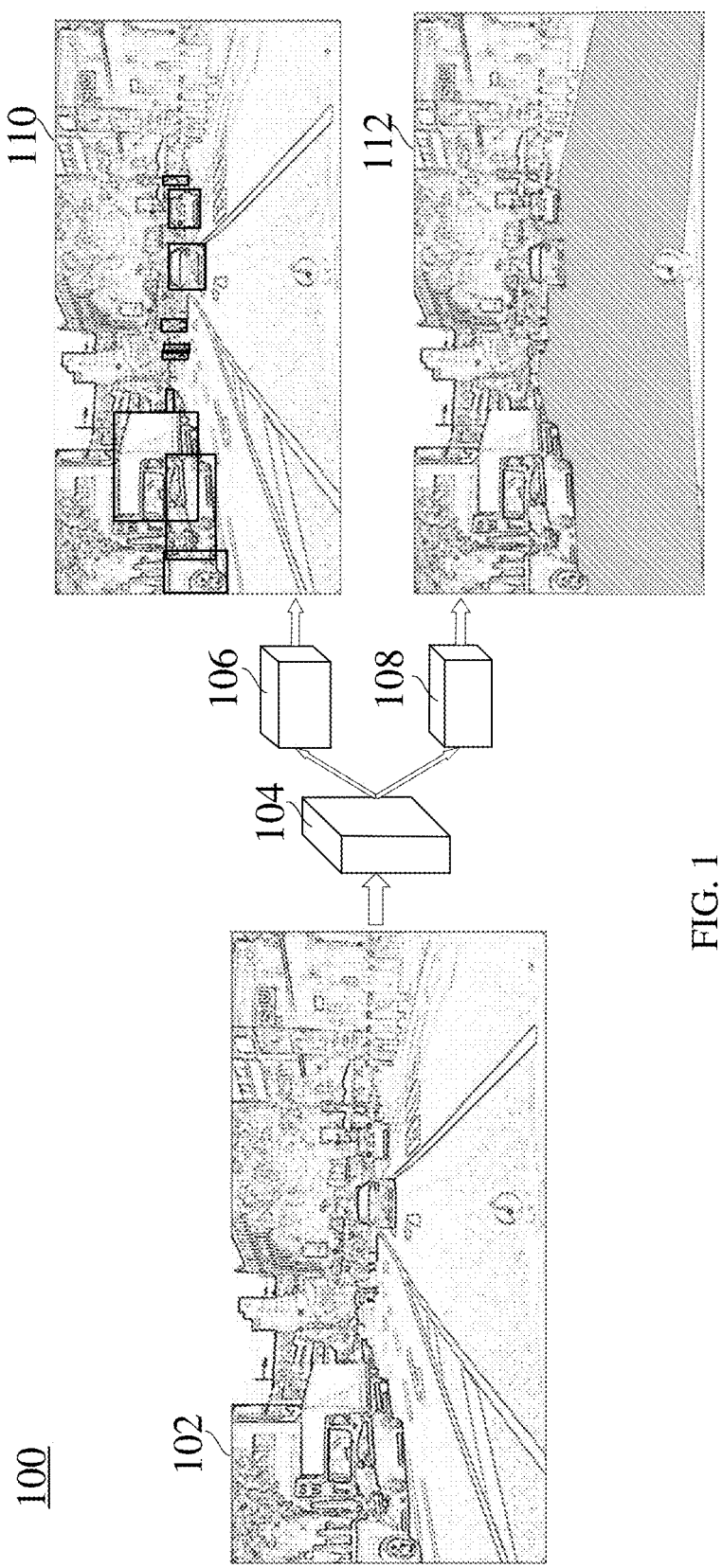
FIG. 1 schematically depicts a structure of a simultaneous object detection and semantic segmentation model according to certain embodiments of the present disclosure.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, "plurality" means two or more. As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor. The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

In certain aspects, the present disclosure relates to a computationally efficient framework for simultaneous object detection and semantic segmentation in a real-time manner. The framework is a novel, lightweight deep neural network. As shown in FIG. 1, the framework 100 includes a neural network backbone 104, an object detection module 106, and a semantic segmentation module 108. The object detection module 106 and the semantic segmentation module 108 share the same neural network backbone 104. When an image of a scene 102 is used as input, the neural network backbone 104 processes the image to obtain a feature map. The feature map is used as inputs for both the object detection module 106 and the semantic segmentation module 108. The object detection module 106 processes the feature map to obtain the image 110, where detected objects are defined using bounding boxes in the image 110 and labeled with names of the objects. The semantic segmentation module 108 processes the feature map to obtain the mask 112, where pixels in the image are classified into categories.

The object detection module 106 and the semantic segmentation module 108 are pre-trained before being used. A hybrid loss function is defined for both the object detection module 106 and the semantic segmentation module 108 during training. By defining the hybrid loss function, the training of the object detection module 106 and the semantic segmentation module 108 is faster and more accurate.

Further, due to the sharing of the neural network backbone 104 and the simple structure of the object detection module 106 and the semantic segmentation module 108, the operation speed of the whole system after training is very fast, and requires less computational power. As a result, real-time object detection and semantic segmentation are achievable in low computation power machine like NVIDIA Jetson TX2. In addition, with this multi-task network, the two tasks can help each other in terms of accuracy.

Figure 2:
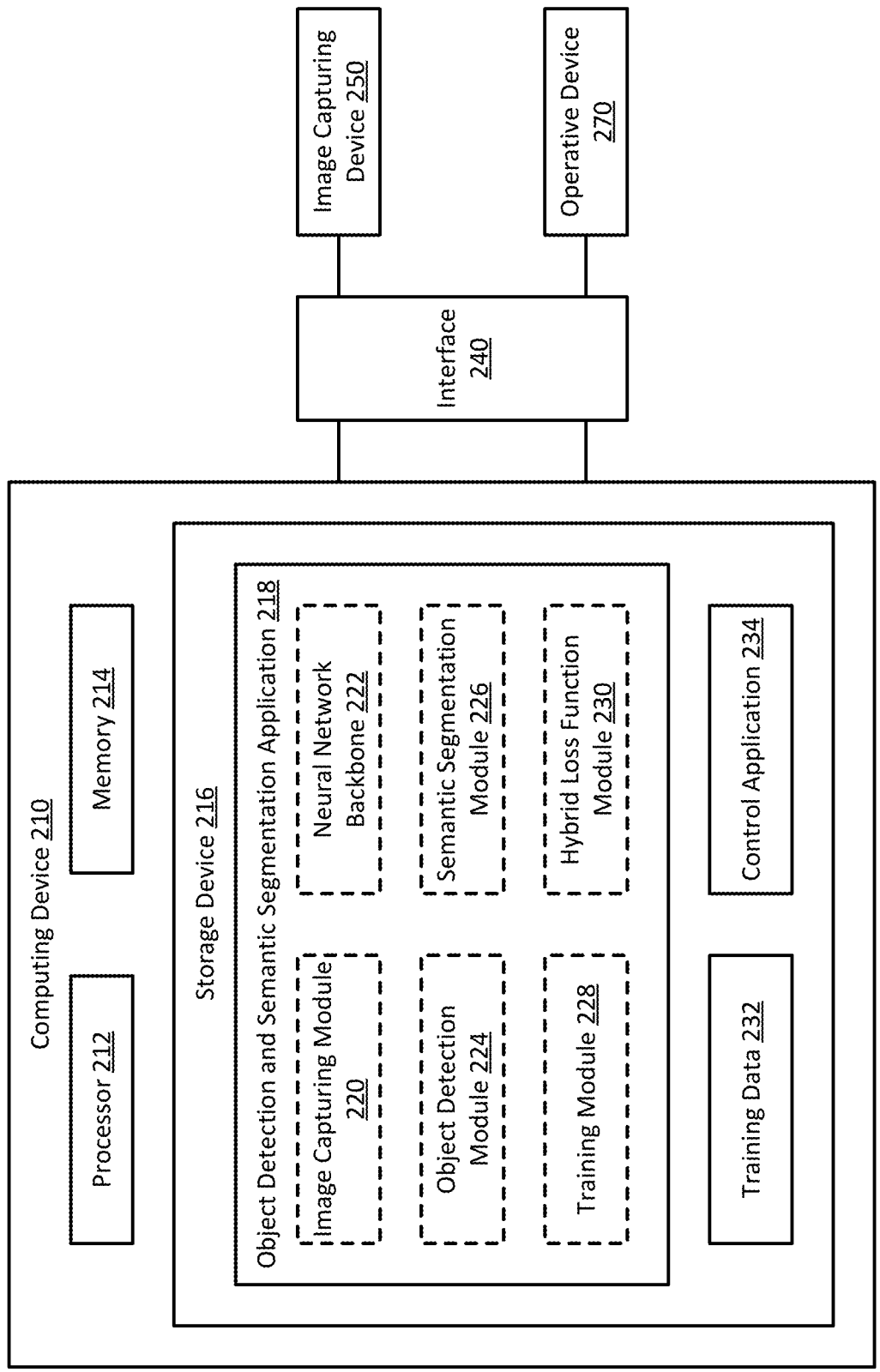
FIG. 2 schematically depicts a system for object detection and semantic segmentation according to certain embodiments of the present disclosure.

FIG. 2 schematically shows a system for real-time, simultaneous object detection and semantic segmentation according to certain embodiments of the present disclosure. As shown in FIG. 2, the system 200 includes a computing device 210, an image capturing device 250, and an operating device 270. The image capturing device 250 and the operating device 270 are in communication with the computing device 210 via, for example, a same or different system interfaces or networks 240. In certain embodiments, the computing device 210 may be a general-purpose computer, a specialized computer, a smart phone, a tablet, a controller, or an embedded device located in for example a self-driving vehicle. The computing device 210 provides simultaneous object detection and semantic segmentation service based on the same image or the same set of images.

In certain embodiments, the system interface 240 may be various buses, storage devices, other I/O devices, or a USB interface. When the interface is a network, the network 240 may be a wired or wireless network, and may be of various forms. Examples of the networks may include, but is not limited to, a local area network (LAN), a wide area network (WAN) including the Internet, or any other type of networks. In certain embodiments, the system interface 240 may be any other types of interfaces to communicatively connect the computing device 210 and the image capturing device 250 and the operating device 270.

In certain embodiments, the image capturing device 250 may be a video camera, a gray scale camera, an RGB camera, an RGB depth camera, a depth camera, a LIDAR, or a combination thereof. The image capturing device 250 is configured to capture an image of an environment or a scene, and preferably to capture images continuously in a format of a video.

In certain embodiments, the operating device 270 may be an autonomous driving vehicle or any other devices that requires instruction based on object detection and semantic segmentation information. When the computing device 210 receives images or videos from the image capturing device 250, performs real-time object detection and semantic segmentation, the computing device 210 may use the obtained real-time information to instruct the operation of the operating device 270. In certain embodiments, the operating device 270 may be controlled by a controller other than the computing device 210, and the controller is configured to receive the object detection and semantic segmentation information from the computing device 210, and uses the information for instructing the operating device 270 to work.

In certain embodiments, as shown in FIG. 2, the computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. The processor 212 can execute an operating system (OS) or other applications of the computing device 210. In some embodiments, the server computing device 210 may have more than one CPU as the processor, such as two CPUs, four CPUs, eight CPUs, or any suitable number of CPUs.

The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214.

The storage device 216 is a non-volatile data storage media for storing the OS (not shown) and other applications of the inventory allocation computing device 210. Examples of the storage device 216 may include non-volatile memory such as flash memory, memory cards, USB drives, hard drives, floppy disks, optical drives, or any other types of data storage devices. In certain embodiments, the computing device 210 may have multiple storage devices 216, which may be identical storage devices or different types of storage devices, and the applications of the computing device 210 may be stored in one or more of the storage devices 216 of the computing device 210.

The storage device 216 includes an object detection and semantic segmentation application 218, and optionally training data 232 and a control application 234. The object detection and semantic segmentation application 218 is configured to use an object detection model and a semantic segmentation model to process captured images, so as to identify objects in the captured images and categorize pixels in the captured images. The training data 232 is used by the object detection and semantic segmentation application 218 to train the application. In certain embodiments, the object detection model and the semantic segmentation model of the object detection and semantic segmentation application 218 may be trained in advance before being installed in the storage device 216, and the storage device 216 doesn't need to have the training data 236. In certain embodiments, the storage device 216 may include other modules necessary for training and performing the semantic segmentation. The control application 234 is configured to, upon receiving the object detection result and semantic segmentation result from the object detection and semantic segmentation application 218, control the operation of the operating device 270 based on the results and operating instructions corresponding to the results. The operating instructions and their correspondence to the results may be stored in the control application 234 in advance.

As shown in FIG. 2, the object detection and semantic segmentation application 218 includes an image capturing module 220, a neural network backbone 222, an object detection module 224, a semantic segmentation module 226, a training module 228, and a hybrid loss function module 230. In certain embodiments, the object detection and semantic segmentation application 218 is performed at real time, and identified objects and the categorized pixels are used at real time for controlling the operating device 270. In certain embodiments, the object detection and semantic segmentation application 218 may not include one or more of the image capturing module 220, the training module 228, and the hybrid loss function module 230, but at least includes the neural network backbone 222, the object detection module 224 and the semantic segmentation module 226. The neural network backbone 222, the object detection module 224 and the semantic segmentation module 226 are preferably pre-trained using a hybrid loss function that considers both object detection and semantic segmentation, where the hybrid loss function is defined by the hybrid loss function module 230.

The image capturing module 220 is configured to instruct the image capturing device 250 to capture images or videos of the scene or environment at real-time. In certain embodiments, the image capture module 220 may also passively receive images captured by the image capturing device 250. After obtaining the images, the image capture module 220 may further pre-process the images. The pre-process may include, among other things, adjusting light balance of the images, reformatting the images, resizing the images, and optionally synchronizing the images from different resources such as multiple cameras of the image capturing device 250. The image capture module 220 then sends the processed images to the neural network backbone 222.

The neural network backbone 222 is configured to, upon receiving an image (or images) from the image capturing module 220, process the image using a neural network backbone to obtain a feature map. In certain embodiments, the neural network backbone 222 is a ResNet18 backbone. In certain embodiment, the obtained feature map includes pixels, and each pixel has a value or vector representing the feature of that pixel. Each vector has a length or dimensions of C. The values of C is learned during training of the application 218. In one example, the input image has a size of 512×512 (height H and width W), and after convolution by the neural network backbone 222, the output includes a 64×64 feature map and a 32×32 feature map. The neural network backbone 222 is configured to send the 64×64 feature map and the 32×32 feature map to the object detection module 224, and send the 64×64 feature map to the semantic segmentation module 226.

The object detection module 224 is configured to, upon receiving the feature map from the neural network backbone 222, process the feature map to identify objects from the image. In certain embodiments, the object detection module 224 may use single shot detector (SSD), deconvolutional single shot detector (DSSD), light-head region-convolutional neural network (R-CNN), Faster R-CNN, region-based fully convolutional networks (R-FCN), feature pyramid networks (FPN), RetinaNet, or you only look once (Yolo) for object detection. In one example, single shot detector (SSD) is used for object detection.

The semantic segmentation module 226 is configured to, upon receiving the feature map from the neural network backbone 222, process the feature map to categorize the pixels of the image. In certain embodiments, the semantic segmentation module 226 may use pyramid scene parsing network (PSPNet) or FCN for semantic segmentation. In one example, PSPNet is used for semantic segmentation.

The training module 228 is configured to train the neural network backbone 222, the object detection module 224, and the semantic segmentation module 226 using the training data 232 and the hybrid loss function provided by the hybrid loss function module 230.

The hybrid loss function module 230 is configured to provide the hybrid loss function for training the neural network backbone 222, the object detection module 224, and the semantic segmentation module 226. The hybrid loss function includes components for both object detection and semantic segmentation. By providing the hybrid loss function and the training data 222, the training process is efficient because the object detection and the semantic segmentation help each other.

The training data 232 includes data for training both object detection and semantic segmentation. Specifically, for a data entry in the training data 232, the training data 232 provides an image, bounding boxes of objects in the image, labels of the objects in the bounding boxes (such as name of the objects), and category label of the pixels in the image.

Figure 3:
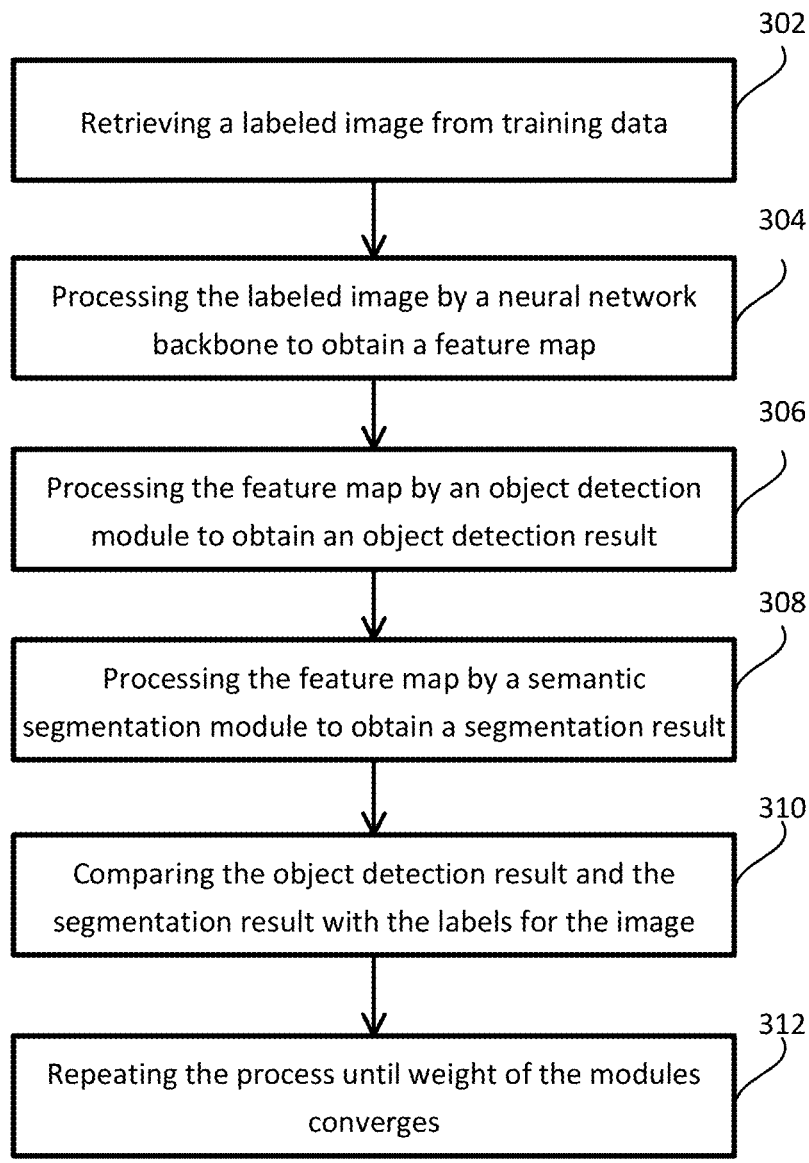
FIG. 3 schematically depicts a method of training an object detection and semantic segmentation model according to certain embodiments of the present disclosure.

In certain aspects, the present disclosure relates to a method for training the object detection and semantic segmentation application 218, specifically the neural network backbone 222, the object detection module 224, and the semantic segmentation module 226. In certain embodiments, the method as shown in FIG. 3 may be implemented on a system as shown in FIG. 2. It should be particularly noted that, unless otherwise stated in the present invention, the steps of the method may be arranged in a different sequential order, and are thus not limited to the sequential order as shown in FIG. 3.

As shown in FIG. 3, at procedure 302, the training module 228 retrieves training data 232, and sends the training data to the neural network backbone 222. Each training entry of the training data 232 includes an image, bounding boxes of objects in the image, labels of the objects in the bounding boxes, and category label of each pixel in the image.

At procedure 304, upon receiving the training data 232, the neural network backbone 222 converts the image to a feature map, and sends the feature map respectively to the object detection module 224 and the semantic segmentation module 226. The procedure 304 is performed using the image but not using the bounding boxes, bounding box/object labels, and pixel labels of the image, and the bounding boxes and the labels of the training image is available for later use.

At procedure 306, upon receiving the feature map from the neural network backbone 222, the object detection module 224 detects objects based on the feature map. The detection results may include bounding boxes in the image and labels of the bounding boxes indicating different objects. The labels may include, for example, car, bicycle, person, traffic light, etc.

At procedure 308, upon receiving the feature map from the neural network backbone 222, the semantic segmentation module 226 segments the image, and provides each pixel a category label based on the feature map. The label for each pixel may include road, person, sidewalk, building, car, etc.

At procedure 310, after completion of the object detection by the object detection module 224 and the semantic segmentation by the semantic segmentation module 226, the training module 228 compares the object detection result and the semantic segmentation result with the original labels for the training image to obtain the difference between the predicted result and the labels in the training data, retrieves the loss function provided by the hybrid loss function module 230, and uses the loss function and the difference to adjust parameters or weights for the neural network backbone 222, the object detection module 224, and the semantic segmentation module 226.

At procedure 312, the procedures 302-310 are repeated a few times until the parameters or weights of the neural network backbone 222, the object detection module 224, and the semantic segmentation module 226 converges.

Figure 4:
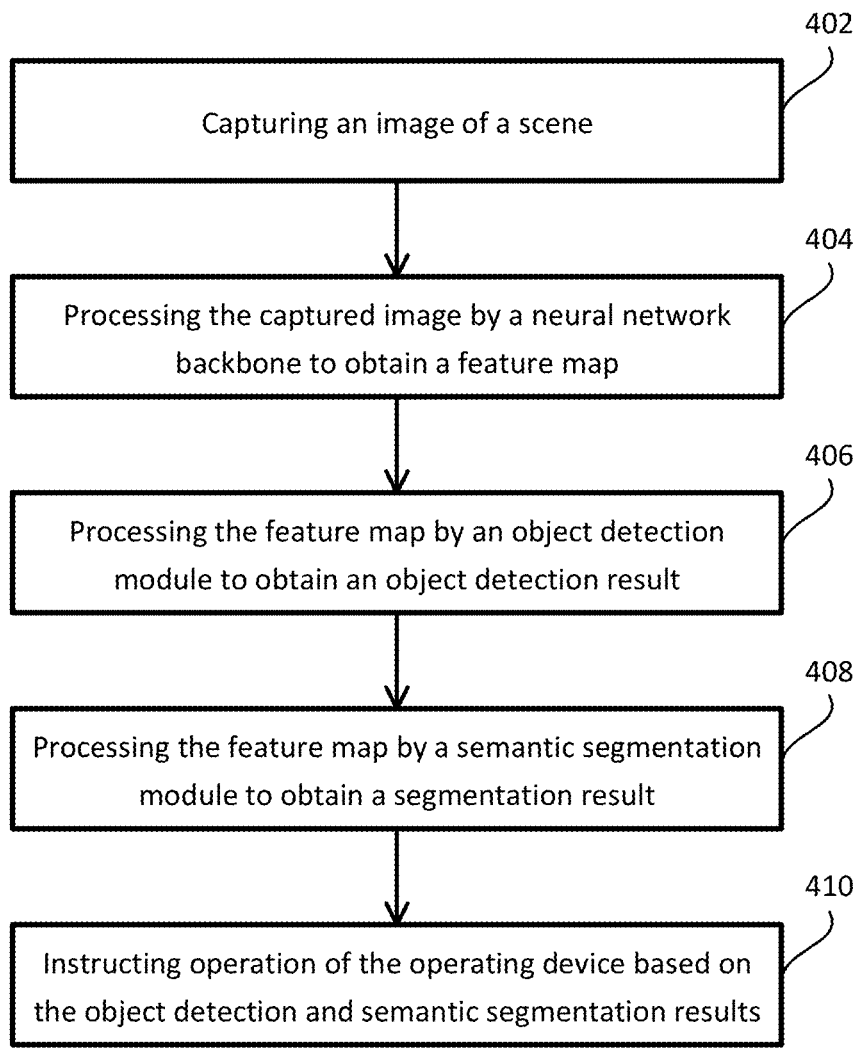
FIG. 4 schematically depicts a method of using an object detection and semantic segmentation model according to certain embodiments of the present disclosure.

In certain aspects, the present disclosure relates to a method for using the application 218 that is well trained as described in FIG. 3. FIG. 4 schematically depicts a real-time, simultaneous object detection and semantic segmentation method according to certain embodiments of the present disclosure. In certain embodiments, the method as shown in FIG. 4 may be implemented on a system as shown in FIG. 2. It should be particularly noted that, unless otherwise stated in the present invention, the steps of the method may be arranged in a different sequential order, and are thus not limited to the sequential order as shown in FIG. 4. In certain embodiments, the method shown in FIG. 4 is similar to the method shown in FIG. 3, and the differences includes: the input images are real-time captured images, not labeled training images; and the comparison between the predicted object detection result and the semantic segmentation result are not necessary.

As shown in FIG. 4, at procedure 402, the image capturing device 250 takes an image of the scene and send the image to the image capturing module 220. The image capturing module 220 receives the image, and sends the image to the neural network backbone 222. In certain embodiments, before sending out the image for further processing, the image capturing module 220 may pre-process the image, such as reformatting or resize the image to meet the requirement of the neural network backbone 222.

At procedure 404, upon receiving the captured image, the neural network backbone 222 converts the captured image to a feature map, and sends the feature map respectively to the object detection module 224 and the semantic segmentation module 226.

At procedure 406, upon receiving the feature map from the neural network backbone 222, the object detection module 224 detects objects based on the feature map. The detection results may include bounding boxes in the captured image and labels of the bounding boxes indicating different objects. The labels may include, for example, car, bicycle, person, traffic light, etc.

At procedure 408, upon receiving the feature map from the neural network backbone 222, the semantic segmentation module 226 segments the image, and provides each pixel a category label based on the feature map. The label for each pixel may include road, person, sidewalk, building, car, etc.

In certain embodiments, the method may further include procedure 410. At procedure 410, the control application 234 uses the object detection results from the object detection module 224 and the semantic segmentation results from the semantic segmentation module 226, and instructs the operation of the operative device 270 based on those results.

Figure 5:
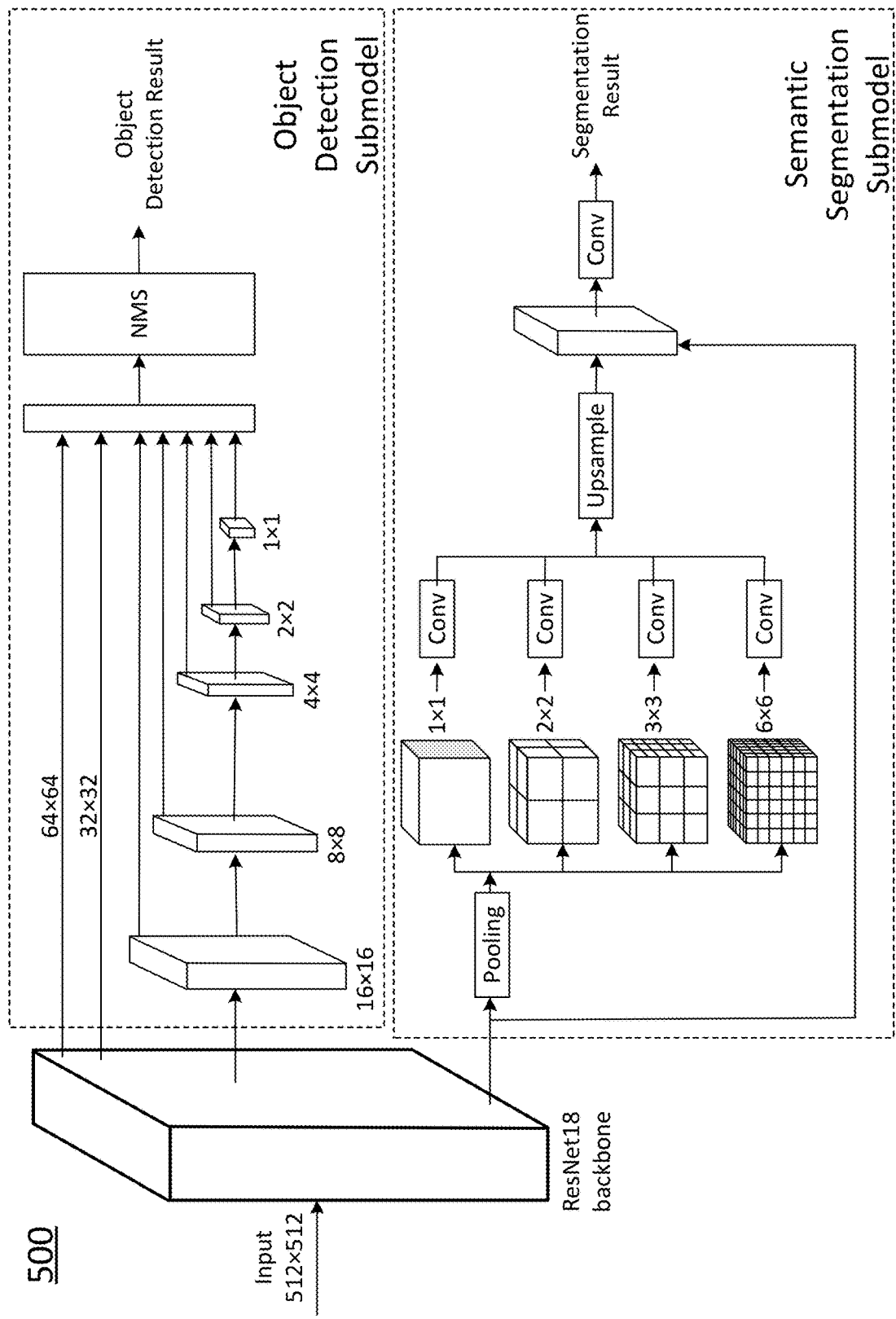
FIG. 5 schematically depicts an exemplary structure of an object detection and semantic segmentation model according to certain embodiments of the present disclosure.

FIG. 5 shows an example of an object detection and semantic segmentation model according to certain embodiments of the present disclosure. In certain embodiments, the model corresponds to the neural network backbone 222, the object detection module 224 and the semantic segmentation module 226, and the model is further defined with a hybrid loss function containing an object detection component and a semantic segmentation component.

As shown in FIG. 5, the model 500 includes a shared ResNet18 backbone, an object detection submodel, and a semantic segmentation submodel. The shared ResNet18 backbone converts an image to a feature map. The feature map is inputted respectively to the object detection submodel and the semantic segmentation submodel. In certain embodiments, the object detection submodel is implemented using SSD, and the semantic segmentation submodel is implemented using pyramid pooling.

The object detection submodel uses multiple convolution layers at different sizes to process the feature map from the ResNet18 backbone. The results from the convolution layers, together with information directly from the ResNet18 backbone, are combined to perform object detection. The detection is further processed with non-maximum suppression to obtain the final object detection result.

The semantic segmentation submodel pools the feature map at different sizes, convolutes the feature map at different H and W sizes. After the convolution, the semantic segmentation submodel upsamples the convoluted result into the same H and W size, and concatenate the upsampled feature maps to obtain a concatenated feature map. The concatenated feature map is then convoluted to obtain the final semantic segmentation result. In the result, each pixel in the captured image is predicted with a category. The categories may include ground, person, building, pole, and trees.

In certain embodiments, the model has the exact layered structure and dimensions as shown in FIG. 5. In certain embodiments, the model has the exact layered structure as shown in FIG. 5, but the sizes of the dimensions H and W may vary or be changed proportionally (keeps dimension C the same). In certain embodiments, the model has the exact layered structure as shown in FIG. 5, but the sizes of the dimensions H and W may vary or be changed proportionally (dimension C may vary but not proportional to the variation of H and W). In certain embodiments, the model has the exact layered structure as shown in FIG. 5, but the sizes of the dimensions H, W and C may vary or be changed proportionally. In certain embodiments, the sizes of the layers in the model shown in FIG. 5 are for illustration only, and are not intended to limit the scope of the disclosure. A variety of H, W, C dimension sizes may be used based on the type of data to be processed In certain aspects, the present invention relates to a non-transitory computer readable medium storing computer executable code. In certain embodiments, the computer executable code may be the software stored in the non-volatile storage device 216 as described above. The computer executable code, when being executed, may perform one of the methods described above. In certain embodiments, the non-transitory computer readable medium may include, but not limited to, the storage device 216 of the computing device 210 as described above, or any other storage media of the computing device 210.

Certain embodiments of the present disclosure, among other things, provides real-time, simultaneous object detection and semantic segmentation. The advantages according to certain embodiments of the disclosure may include: (1) a shared, light weight backbone network which makes the model much faster; (2) the interaction between the SSD and the feature pyramid pooling, at least by the shared ResNet18 backbone and the hybrid loss function, which makes the prediction more efficient and accurate; (3) the simultaneous realization of both object detection and segmentation, which facilitate controlling of operative devices, such as an autonomous vehicle.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

[1] Hengshuang Zhao et al, Pyramid Scene Parsing Network, IEEE Conference on Computer Vision and Pattern Recognition, 2017, arXiv:1612.01105.
[2] Jonathan Long et al, Fully Convolutional Models for Semantic Segmentation, IEEE Conference on Computer Vision and Pattern Recognition, 2015, arXiv:1411.4038.
[3] Cheng-Yang Fu et al, DSSD: Deconvolutional Single Shot Detector, 2017, arXiv: 1701.06659.
[4] Zeming Li et al, Light-Head R-CNN, In Defense of Two-Stage Object Detector, 2017, arXiv:1711.07264.
[5] Kaiming He, Mask R-CNN, IEEE Conference on Computer Vision and Pattern Recognition, 2018, arXiv: 1703.06870.

What is claimed is:

1. A system for object detection and semantic segmentation, the system comprising a computing device, the computing device comprising a processor and a non-volatile memory storing computer executable code, wherein the computer executable code, when executed at the processor, is configured to:
   receive an image of a scene;
   process the image using a neural network backbone to obtain a feature map;
   process the feature map using an object detection module to obtain object detection result of the image; and
   process the feature map using a semantic segmentation module to obtain semantic segmentation result of the image,
   wherein the object detection module and the semantic segmentation module are trained using a same loss function comprising an object detection component and a semantic segmentation component; and
   wherein the neural network backbone comprises a ResNet18 backbone truncated away from its $4^{th}$ block;
   wherein the object detection module consists of sequentially:
      five convolution layers;
      a detection layer; and
      a non-maximum suppression (NMS) layer,
   wherein for a 512×512 resolution of the image, the neural network backbone convolutionally adds 64×64 information and 32×32 information to the detection layer, and the five convolutional layers respectively add 16×16 information, 8×8 information, 4×4 information, 2×2 information, and 1×1 information to the detection layer, and
   wherein the step of processing the feature map using an object detection module to obtain object detection result of the image comprises:
      processing the feature map using the five convolution layers at different sizes;
      performing object detection by using a combination of the 16×16 information, 8×8 information, 4×4 information, 2×2 information, and 1×1 information respectively from the five convolution layers and the 64×64 information and 32×32 information directly from the ResNet18 backbone; and
      processing the objection detection with the non-maximum suppression layer to obtain the object detection result.

2. The system of claim 1, wherein training data for the object detection module and the semantic segmentation module comprises: a training image, at least one bounding box defined in the training image, label of the at least one bounding box, and mask of the training image.

3. The system of claim 1, wherein the object detection module is a single shot detector (SSD).

4. The system of claim 1, wherein the semantic segmentation module is a pyramid pooling module.

5. The system of claim 1, wherein the semantic segmentation module consists sequentially:
   a pooling module pooling the feature map to obtain pooled features at different sizes;
   a plurality of convolution layers each convoluting one of the pooled features at different sizes to obtain convoluted features at different sizes;
   an upsample module receiving the convoluted features at different sizes to obtain upsampled feature;
   a concatenation layer receiving the upsampled feature and feature from the neural network backbone to obtain concatenated feature; and
   a convolution layer convoluting the concatenated feature to obtain per-pixel prediction as the semantic segmentation result.

6. The system of claim 5, wherein the pooled features are at sizes of 1×1, 2×2, 3×3, and 6×6.

7. The system of claim 1, wherein the computer executable code is further configured to control an operative device in the scene based on the object detection result and the semantic segmentation result.

8. A method for object detection and semantic segmentation, comprising:
   receiving, by a computing device, an image of a scene;
   processing, by the computing device, the image using a neural network backbone to obtain a feature map;
   processing, by the computing device, the feature map using an object detection module to obtain object detection result of the image; and
   processing, by the computing device, the feature map using a semantic segmentation module to obtain semantic segmentation result of the image,
   wherein the object detection module and the semantic segmentation module are trained using a same loss function comprising an object detection component and a semantic segmentation component; and
   wherein the neural network backbone comprises a ResNet18 backbone truncated away from its $4^{th}$ block,
   wherein the object detection module consists of sequentially:
      five convolution layers;
      a detection layer; and
      a non-maximum suppression (NMS) layer,
   wherein for a 512×512 resolution of the image, the neural network backbone convolutionally adds 64×64 information and 32×32 information to the detection layer, and the five convolutional layers respectively add 16×16 information, 8×8 information, 4×4 information, 2×2 information, and 1×1 information to the detection layer, and
   wherein the step of processing the feature map using an object detection module to obtain object detection result of the image comprises:
      processing the feature map using the five convolution layers at different sizes;
      performing object detection by using a combination of the 16×16 information, 8×8 information, 4×4 information, 2×2 information, and 1×1 information respectively from the five convolution layers and the 64×64 information and 32×32 information directly from the ResNet18 backbone; and
      processing the objection detection with the non-maximum suppression layer to obtain the object detection result.

9. The method of claim 8, wherein training data for the object detection module and the semantic segmentation module comprises: a training image, at least one bounding box defined in the training image, label of the at least one bounding box, and mask of the training image.

10. The method of claim 8, wherein the object detection module is a single shot detector.

11. The method of claim 8, wherein the semantic segmentation module is a pyramid pooling module.

12. The method of claim 8, wherein the semantic segmentation module consists sequentially:
   a pooling module pooling the feature map to obtain pooled features at different sizes;
   a plurality of convolution layers each convoluting one of the pooled features at different sizes to obtain convoluted features at different sizes;
   an upsample module receiving the convoluted features at different sizes to obtain upsampled feature;
   a concatenation layer receiving the upsampled feature and feature from the neural network backbone to obtain concatenated feature; and
   a convolution layer convoluting the concatenated feature to obtain the semantic segmentation result.

13. The method of claim 8, further comprising: controlling an operative device in the scene based on the object detection result and the semantic segmentation result.

14. A non-transitory computer readable medium storing computer executable code, wherein the computer executable code, when executed at a processor of a computing device, is configured to:
   receive an image of a scene;
   process the image using a neural network backbone to obtain a feature map;
   process the feature map using an object detection module to obtain object detection result of the image; and
   process the feature map using a semantic segmentation module to obtain semantic segmentation result of the image,
   wherein the object detection module and the semantic segmentation module are trained using a same loss function comprising an object detection component and a semantic segmentation component; and
   wherein the neural network backbone comprises a ResNet18 backbone truncated away from its $4^{th}$ block,
   wherein the object detection module consists of sequentially:
      five convolution layers;
      a detection layer; and
      a non-maximum suppression (NMS) layer,
   wherein for a 512×512 resolution of the image, the neural network backbone convolutionally adds 64×64 information and 32×32 information to the detection layer, and the five convolutional layers respectively add 16×16 information, 8×8 information, 4×4 information, 2×2 information, and 1×1 information to the detection layer, and
   wherein the step of processing the feature map using an object detection module to obtain object detection result of the image comprises:
      processing the feature map using the five convolution layers at different sizes;

performing object detection by using a combination of the 16×16 information, 8×8 information, 4×4 information, 2×2 information, and 1×1 information respectively from the five convolution layers and the 64×64 information and 32×32 information directly from the ResNet18 backbone; and processing the objection detection with the non-maximum suppression layer to obtain the object detection result.

15. The non-transitory computer readable medium of claim 14, wherein the semantic segmentation module consists sequentially:

a pooling module pooling the feature map to obtain pooled features at different sizes;

a plurality of convolution layers each convoluting one of the pooled features at different sizes to obtain convoluted features at different sizes;

an upsample module receiving the convoluted features at different sizes to obtain upsampled feature;

a concatenation layer receiving the upsampled feature and feature from the neural network backbone to obtain concatenated feature; and a convolution layer convoluting the concatenated feature to obtain per-pixel prediction as the semantic segmentation result.

* * * * *